UNITED STATES PATENT OFFICE.

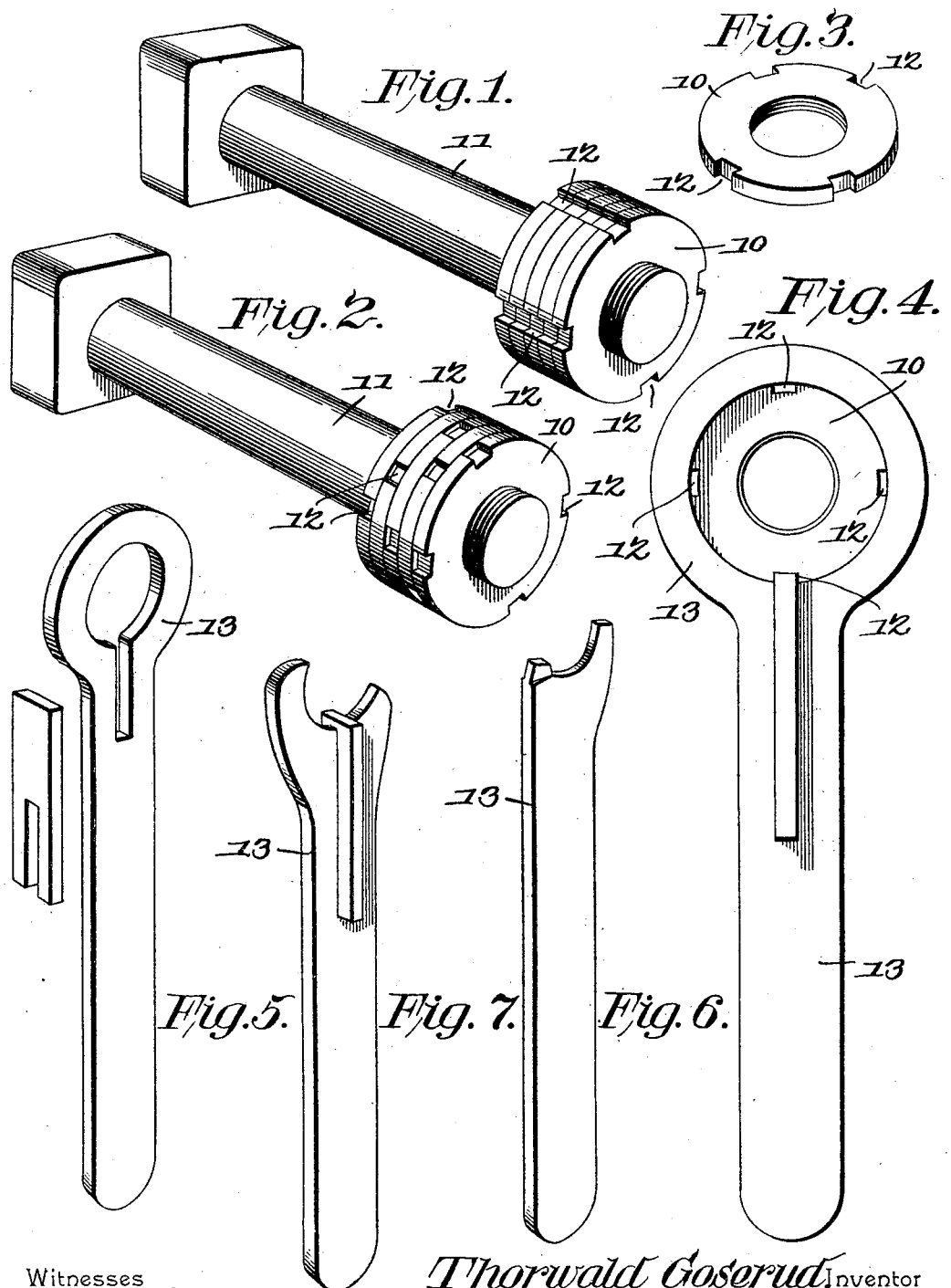

THORWALD GOSERUD, OF STURGEON BAY, WISCONSIN.

LOCK-NUT.

No. 799,644.     Specification of Letters Patent.     Patented Sept. 19, 1905.

Application filed January 23, 1905. Serial No. 242,396.

*To all whom it may concern:*

Be it known that I, THORWALD GOSERUD, a citizen of the United States, residing at Sturgeon Bay, in the county of Door and State of Wisconsin, have invented a new and useful Lock-Nut, of which the following is a specification.

This invention relates to the nuts of bolts having means whereby they are prevented from backward rotation thereon, and has for its object to simplify and improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of a bolt with one of the improved nuts in one of its positions thereon, and Fig. 2 is a similar view with the nut in another of its positions. Fig. 3 is a perspective view of one of the nut members detached. Fig. 4 is a plan view with one of the improved wrench members applied. Figs. 5, 6, and 7 are perspective views of various forms of wrenches capable of use upon the improved nut.

The improved nut comprises a plurality of members 10, preferably in disk or annular form, each with one complete internal screw-thread and adapted for superimposed position upon the threaded end of a bolt 11, the combined thickness of the members 10 being substantially equal to an ordinary nut. The members 10 are provided with transverse notches 12 in their edges, the notches adapted for registration when the members are placed in one position, as in Fig. 1, when the improved nut is first applied to the bolt.

A key-wrench of any of the forms shown at 13 in Figs. 4, 5, 6, or 7 will be employed to rotate the improved nut as a whole upon the bolt as far as it will go, and then to complete the action and firmly lock the nut from reverse movement the wrench 13 is moved outwardly a distance equal to the thickness of the innermost nut member and the remaining nut members rotated for a further distance, and so on as many times as there are nut members, each nut member being thus further tightened to a slight degree and very firmly "locking" the nut members from reverse movement and placing the notches in irregular positions, as in Fig. 2.

The nut is very simple in construction, effective in action, and is as strong and durable as any nut of the ordinary construction.

The improved nut can be manufactured in all the various sizes of ordinary nuts and employed wherever the ordinary nut is capable of employment or wherever a lock-nut is required.

Having thus described the invention, what is claimed is—

1. A nut comprising a plurality of superposed threaded disks having each a peripheral notch and arranged to be operated as a single nut with the notches registering and forming a longitudinal groove and independently as jam-nuts with the notches out of register.

2. A nut comprising a plurality of superposed annular threaded disks having each a peripheral notch and arranged to be operated simultaneously as a single nut by a tool with the notches registering and forming a longitudinal groove for engagement with the tool and independently as jam-nuts with the notches out of register.

In testimony that I claim the foregoing as my own I have hereto affixed my signature in the presence of two witnesses.

THORWALD GOSERUD.

Witnesses:
    JACOB DEHOS,
    A. A. MINOR.